United States Patent
Kulkarni

(10) Patent No.: US 7,062,494 B2
(45) Date of Patent: Jun. 13, 2006

(54) SYSTEM, METHOD AND COMPUTER READABLE MEDIUM FOR PERFORMING AN AGGREGATE DATABASE QUERY

(75) Inventor: Suhas Sudhakar Kulkarni, Thane (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 599 days.

(21) Appl. No.: 10/201,436

(22) Filed: Jul. 22, 2002

(65) Prior Publication Data
US 2004/0015482 A1    Jan. 22, 2004

(51) Int. Cl.
*G06F 17/30* (2006.01)
(52) U.S. Cl. .......................... 707/100; 707/4; 707/200
(58) Field of Classification Search ............. 707/1–10, 707/100–102, 104.1, 200–201; 715/533; 718/104
See application file for complete search history.

(56) References Cited

U.S. PATENT DOCUMENTS

| | | | |
|---|---|---|---|
| 6,115,705 A * | 9/2000 | Larson .......................... 707/3 |
| 6,148,298 A * | 11/2000 | LaStrange et al. ............. 707/5 |
| 6,182,061 B1 * | 1/2001 | Matsuzawa et al. ........... 707/2 |
| 6,778,976 B1 * | 8/2004 | Haas et al. ..................... 707/2 |
| 6,842,753 B1 * | 1/2005 | Chaudhuri et al. ........... 707/10 |
| 2002/0010695 A1 * | 1/2002 | Kearsey et al. |
| 2003/0004959 A1 * | 1/2003 | Kotsis et al. |

* cited by examiner

*Primary Examiner*—Greta Robinson
*Assistant Examiner*—Miranda Le

(57) ABSTRACT

A method for performing a query on records in a table is disclosed. The table has at least a first field, a second field and a third field. The query is for obtaining an aggregate result on the third field of records for at least one combination of the first and the second fields. The method includes receiving a query involving a single query statement. This query statement includes at least one built-in function corresponding to the second field of the combination. Each built-in function includes a mathematical formula that selects only a third field of records whose second field equals the second field of the combination. The method also includes executing the query statement to produce the aggregate result.

6 Claims, 2 Drawing Sheets

```
select item_code,
      sum((round(((20-mod(transaction_code,20))/20)-0.5))*quantity) as sum20,
      sum((round(((21-mod(transaction_code,21))/21)-0.5))*quantity) as sum21,
      sum((round(((22-mod(transaction_code,22))/22)-0.5))*quantity) as sum22,
      sum((round(((23-mod(transaction_code,23))/23)-0.5))*quantity) as sum23,
      sum((round(((24-mod(transaction_code,24))/24)-0.5))*quantity) as sum24,
      sum((round(((25-mod(transaction_code,25))/25)-0.5))*quantity) as sum25,
      sum((round(((26-mod(transaction_code,26))/26)-0.5))*quantity) as sum26,
      sum((round(((27-mod(transaction_code,27))/27)-0.5))*quantity) as sum27,
      sum((round(((28-mod(transaction_code,28))/28)-0.5))*quantity) as sum28,
      sum((round(((29-mod(transaction_code,29))/29)-0.5))*quantity) as sum29,
      sum((round(((30-mod(transaction_code,30))/30)-0.5))*quantity) as sum30,
from transaction_table
group by item_code
```

FIG. 1

SYSTEM, METHOD AND COMPUTER READABLE MEDIUM FOR PERFORMING AN AGGREGATE DATABASE QUERY

BACKGROUND

This invention relates generally to database systems, and more particularly to an aggregate query in database systems.

A database is a collection of information. Relational databases are typically illustrated as one or more two-dimensional tables. Each table arranges the information in rows and columns. Each row corresponds to a record. Each column corresponds to a field. In a relational database a collection of tables can be related or joined to each other through a common field or key. The common key enables information in one table to be automatically cross-referenced to corresponding information in another table.

A complex search may be performed on a database with a query. A query specifies a set of criteria (e.g., the quantity of parts from a particular transaction) to define identified information for a database program to retrieve from the database. An aggregate query is a query that requests information concerning a selected group of records. For example, in a database which stores sales transactions, an aggregate query may request the total quantity of an item in a particular transaction. Each aggregate query may include a set of criteria to select records (e.g., grouping of records by an item code field and a transaction code field), and an operation to perform on the group of selected records (e.g., summing the quantity fields). Typical operations for aggregate queries include counting, summing, averaging, and finding minimum and maximum values.

To perform an aggregate query, a conventional database management system (DBMS) examines every record in the database to determine whether or not the record matches the set of criteria. The DBMS constructs a query table, known as a virtual table or view, from the records that match the set of criteria. The DBMS then performs the required aggregate operation over the appropriate fields from each record in the view.

As an illustration, the table below, TRANSACTION_TABLE, is one which can be queried using an aggregate query. The table has three fields arranged in a vertical format. The three fields are an ITEM_CODE field, a TRANSACTION_CODE field and a QUANTITY field. Separate records may have the same ITEM_CODE field and TRANSACTION_CODE field. An aggregate query may involve summing the QUANTITY fields of records sharing the same ITEM_CODE field and TRANSACTION_CODE field.

TABLE 1

TRANSACTION_TABLE

| ITEM_CODE | TRANSACTION_CODE | QUANTITY |
|---|---|---|
| Item_1 | 20 | 200 |
| Item_1 | 20 | 50 |
| Item_1 | 21 | 70 |
| Item_1 | 22 | 400 |
| Item_1 | 22 | 50 |
| Item_1 | 22 | 25 |
| Item_1 | 24 | 50 |
| Item_1 | 25 | 80 |
| Item_1 | 30 | 65 |
| Item_2 | 20 | 100 |
| Item_2 | 21 | 85 |
| Item_2 | 23 | 35 |
| Item_2 | 23 | 80 |
| Item_2 | 26 | 250 |
| Item_2 | 27 | 320 |
| Item_2 | 28 | 90 |

The output of the aggregate query may be tabulated in an OUTPUT_TABLE as follows:

TABLE 2

OUTPUT_TABLE

| ITEM_CODE | Sum 20 | Sum 21 | Sum 22 | Sum 23 | Sum 24 | Sum 25 | Sum 26 | Sum 27 | Sum 28 | Sum 29 | Sum 30 |
|---|---|---|---|---|---|---|---|---|---|---|---|
| Item_1 | 250 | 70 | 475 | 0 | 50 | 80 | 0 | 0 | 0 | 0 | 65 |
| Item_2 | 100 | 85 | 0 | 115 | 0 | 0 | 250 | 320 | 90 | 0 | 0 |

Such an aggregate query involves two steps and uses structured query language (SQL) statements as follows:

STEP 1: Create Intermediate Table or View

```
create view trans_view (item_code, quantity20, quantity21,
quantity22, quantity23, quantity24, quantity25, quantity26,
quantity27, quantity28, quantity29, quantity 30)
as
select item_code,
        sum(quantity) as quantity20,
        0,
        0,
        0,
        0,
        0,
        0,
        0,
        0,
        0,
        0,
```

-continued

```
from transaction_table where transaction_code=20
group by item_code
union
select item_code,
        0
        sum(quantity) as quantity21,
        0,
        0,
        0,
        0,
        0,
        0,
        0,
        0,
        0,
from transaction_table where transaction_code=21
group by item_code
union
select item_code,
        0,
        0,
        sum(quantity) as quantity22,
        0,
        0,
        0,
        0,
        0,
        0,
        0,
from transaction_table where transaction_code=22
group by item_code
union
    .
    .
    .
select item_code,
        0,
        0,
        0,
        0,
        0,
        0,
        0,
        0,
        0,
        0,
        sum(quantity) as quantity30,
from transaction_table where transaction_code=30
group by item_code;
Step 2: Query the Intermediate View select item_code,
        sum(quantity20) as sum20,
        sum(quantity21) as sum21,
        sum(quantity22) as sum22,
        sum(quantity23) as sum23,
        sum(quantity24) as sum24,
        sum(quantity25) as sum25,
        sum(quantity26) as sum26,
        sum(quantity27) as sum27,
        sum(quantity28) as sum28,
        sum(quantity29) as sum29,
        sum(quantity30) as sum30
    from trans_view
    group by item_code;
```

As can be seen from the above statements, the first step involves generation of an intermediate table or view (trans_view) from information stored in the TRANSACTION_TABLE. The second step queries the intermediate view (trans_view) to produce the OUTPUT_TABLE. The query statements are lengthy and may be difficult to maintain.

SUMMARY

According to an aspect of the present invention, there is provided a method for performing a query on records in a table. The table has at least a first field, a second field and a third field. The query is for obtaining an aggregate result on the third field of records for at least one combination of the first and the second fields. The method includes receiving a query involving a single query statement. This query statement includes at least one built-in function corresponding to the second field of the combination. Each built-in function includes a mathematical formula that selects only a third field of records whose second field equals the second field of the combination. The method also includes executing the query statement to produce the aggregate result.

According to another aspect of the present invention, there is provided a program storage device readable by a computing device, tangibly embodying a program of instructions, executable by the computing device to perform the above-described method.

According to yet another aspect of the present invention, there is provided a method for performing a query on records in a table. The table has at least a first field type and a second field type. The query is for obtaining an aggregate result on second field occurrences of records for at least a selected first field occurrence. The method includes receiving a query involving a single query statement. This single query statement includes at least one built-in function corresponding to the selected first field occurrence. The built-in function includes a mathematical formula that selects only a second field occurrence of records whose first field occurrence is equal to the selected first field. The query also includes executing the query statement to produce the aggregate result.

BRIEF DESCRIPTION OF DRAWINGS

The invention will be better understood with reference to the drawings, in which;

FIG. 1 is a flowchart showing a sequence of steps for performing an aggregate query according to an embodiment of the present invention;

DETAILED DESCRIPTION

Figure 2:
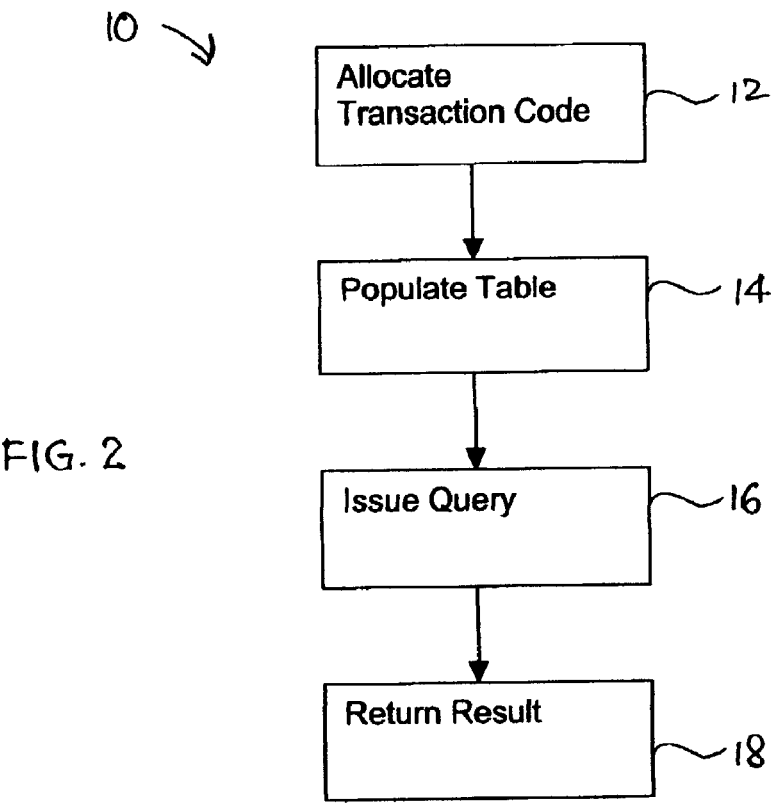
FIG. 2 is a single SQL query statement that supports the sequence in FIG. 1.

In any database table, such as the TRANSACTION_TABLE in the background section, a field is the smallest named unit of data. A table will, in general, contain many occurrences or instances of each of several types of fields. For example, the TRANSACTION_TABLE includes three types of fields, an ITEM_CODE field type, a TRANSACTION_CODE field type and a QUANTITY field type and many occurrences of each of these field types. An entry in the TRANSACTION_TABLE relating one of each of the field types is known as a record. Similarly, a record type is distinguishable from a record occurrence or instance. A record occurrence or instance includes a group of related field occurrences. Therefore, a record occurrence in the TRANSACTION_TABLE includes an occurrence of the ITEM_CODE field type, the TRANSACTION_CODE field type and the QUANTITY field type. It is common practice to drop the qualifiers "type" and "occurrence" for fields and records, and to rely on context to indicate which of the two is meant. Such a practice is convenient, and is adopted in the following description of the invention.

The TRANSACTION_TABLE contains multiple records, some of which share a same ITEM_CODE field and a TRANSACTION_CODE field. The records in the TRANSACTION_TABLE are said to be arranged in a vertical format. Although the TRANSACTION_TABLE includes only three fields, it should be noted that the invention could be practiced on database tables with two fields and four or more fields. For a table, such as the TRANSACTION_TABLE, it is sometimes desirable to obtain an aggregate result, such as the sum, of the QUANTITY fields of records having a particular combination of the ITEM_CODE and the TRANSACTION_CODE fields. For example, there are two records in the TRANSACTION_TABLE having an ITEM_CODE field of "Item_1" and a TRANSACTION_CODE field of "20". Addition of the QUANTITY fields of these two records yields a result of "250." It would be desirable for a user to be able to query the TRANSACTION_TABLE to obtain such a total of the QUANTITY fields of these two records.

Similarly, it is desirable to query the TRANSACTION_TABLE to obtain the sum of the QUANTITY fields for other records having unique combinations of the ITEM_CODE field and the TRANSACTION_CODE field. The OUTPUT_TABLE in the background section is a tabulation of aggregate results obtained from such a query. The fields, SUM20, SUM21, SUM23 . . . , SUM29, SUM30 in the OUTPUT_TABLE are aggregate results for records having TRANSACTION_CODE fields of 20, 21, 22 . . . , 29, 30 respectively for each ITEM_CODE field. The SUM fields in the OUTPUT_TABLE are arranged in a horizontal format.

On a computing device that supports a database management system (DBMS), a user issues a query to obtain the aggregate results in the OUTPUT_TABLE. FIG. 1 shows a Structured Query Language (SQL) statement 2 that effects such a query. The query statement 2 includes several built-in functions 4 corresponding to each predetermined occurrence of the TRANSACTION_CODE field. In the TRANSACTION_TABLE, these predetermined occurrences are integers 20–30. Each built-in function includes a mathematical formula 6 that selects only a QUANTITY field of records whose TRANSACTION_CODE field is equal to the TRANSACTION_CODE field of the built-in function. The QUANTITY fields related to other TRANSACTION_CODE fields are ignored. The mathematical formula 6 will be described in more details shortly.

FIG. 2 is a flowchart showing a sequence 10 of steps for performing an aggregate query on a database table, such as the TRANSACTION_TABLE, according to an embodiment of the present invention. The sequence 10 starts in an ALLOCATE TRANSACTION_CODE step 12, wherein a range of integers having a maximum value that is not more than twice a minimum value is allocated to be used as the TRANSACTION_CODE fields. An example of such a range are the integers between 20–30. The sequence 10 next proceeds to a POPULATE TABLE step 14, wherein records are entered in the TRANSACTION_TABLE.

After the TRANSACTION_TABLE is populated with records, the sequence 10 proceeds to an ISSUE QUERY step 16, wherein the SQL query statement 2 is issued to the DBMS. The sequence 10 ends in a RETURN RESULT step 18, wherein the DBMS receives the query, executes it and returns the result in a horizontal format according to the OUTPUT_TABLE. The result is grouped according to the ITEM_CODE field. There is a row corresponding to each ITEM_CODE field. The row includes an aggregate result of the QUANTITY fields for each TRANSACTION_CODE field.

The mathematical formula 6 in one of the built-in functions 4, in this case a built-in function 4 corresponding to a TRANSACTION_CODE field of "20" is next described. This mathematical formula is as follows:

$$\mathrm{round}(((20-\mathrm{mod}(\mathrm{TRANSACTION\_CODE}, 20))/20) - 0.5) * \mathrm{QUANTITY}$$

A first portion 30 (FIG. 1) of the mathematical formula 6 works out to be unity only if the TRANSACTION_CODE field of a record is "20". In that case, the QUANTITY field of the record is "selected" to be processed as part of the aggregate query. For records with a TRANSACTION_CODE field that is not equal to "20", the first portion 30 works out to be zero so that the respective QUANTITY fields are ignored in the aggregate query. The mathematical formula, expressed in a more general format, is as follows:

$$\mathrm{round}(((X-\mathrm{mod}(Y,X))/X) - 0.5) * Z$$

where X is a selected occurrence of a selected field of a record;

Y is an occurrence of the selected field; and

Z is an occurrence of another field in the record.

Modifications to the query statement 2 in FIG. 1 are possible. As an example, a line "where ITEM_CODE=Item_1" may precede the line "group by item_code" in the query statement if it is desired to obtain only an aggregate result of records whose ITEM_CODE field equals "Item_1". As another example, the built-in functions 4 may also be selected according to the desired TRANSACTION_CODE fields instead of including built-in functions 4 for all TRANSACTION_CODE fields. Therefore the query statement 2 may include at least one built-in function 4 corresponding to a selected TRANSACTION_CODE field.

Figure 3:
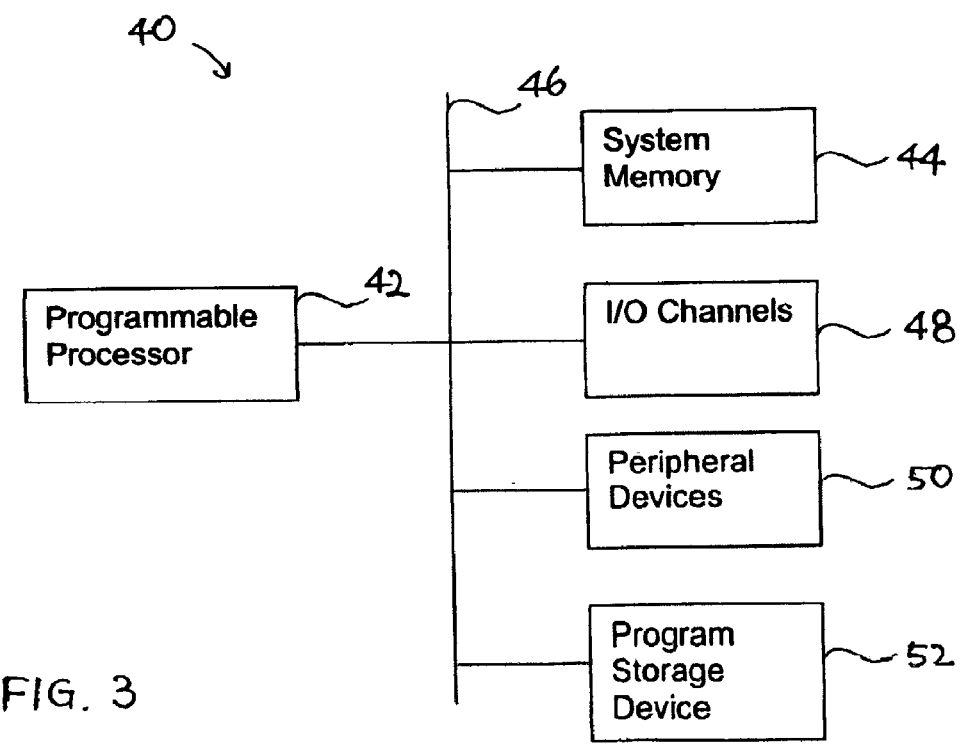
FIG. 3 is a block diagram of a computing device on which the sequence in FIG. 1 may be implemented.

FIG. 3 is a block diagram illustrating typical elements of a computing device 40 on which the DBMS may be supported. The elements include a programmable processor 42 connected to a system memory 44 via a system bus 46. The processor 42 accesses the system memory 44 as well as other input/output (I/O) channels 48 and peripheral devices 50. The computing system 40 further includes at least one program storage device 52, such as a CD-ROM, tape, magnetic media, EPROM, EEPROM, ROM or the like. The computing system 40 stores one or more computer programs that implement the sequence 10 described above. The processor 42 reads and executes the one or more computer programs to perform the sequence 10.

Advantageously, the method of performing an aggregate query described above results in a more compact query statement than the prior art. This compact query statement is easier to understand and maintain. Moreover, there is no need for the creation of any temporary table or view.

Although the present invention is described as implemented in the above embodiment, it is not to be construed to be limited as such. For example, instead of limiting the aggregate operation to a sum operation, the aggregate operation may also be a maximum operation.

As another example, the query statement is described above as an interactive query language. The query statement may also be used as a database programming language embedded within a variety of host languages.

I claim:

1. A computer-implemented method for performing a query on records in a table with at least a first field, a second field and a third field to obtain an aggregate result on the third field of records for at least one selected combination of the first and the second fields, the method comprising;

receiving a query involving a single query statement that includes at least one built-in function corresponding to the second field of the selected combination, wherein the built-in function includes a mathematical formula that selects only a third field of records whose second field is equal to the second field of the selected combination, wherein the mathematical formula is:

round(((X−mod(Y,X))/X)−0.5)*Z where X is the second field of the selected combination; Y is an occurrence of the second field of a record; and Z is an occurrence of the third field of a record;
wherein the second field is obtained from a range having a maximum value that is not more twice a minimum value;
executing the query statement to produce the aggregate result; and
displaying the aggregate result in a horizontal format which includes a row corresponding to each first field wherein the row includes an aggregate result for each second field.

2. A method according to claim 1, wherein executing the query statement includes executing the query statement to produce the aggregate result without generation of an intermediate view.

3. A method according to claim 1, wherein the aggregate query includes one of a sum and a maximum operation.

4. A method according to claim 1, wherein the at least one selected combination of the first and the second fields includes all unique combinations of the first and the second fields and wherein receiving a query includes receiving a query involving a single query statement that includes a plurality of built-in functions corresponding to each second field of the combinations, wherein each built-in function includes a mathematical formula that selects only a third field of records whose second field is equal to the second field described in the built-in function.

5. A program storage device readable by a computing device, tangibly embodying a program of instructions, executable by the computing device to perform a method for performing a query on records in a table with at least a first field, a second field and a third field, to obtain an aggregate result on the third field of records for at least one selected combination of the first and the second fields, the method comprising:

receiving a query involving a single query statement that includes at least one built-in function corresponding to the second field of the selected combination, wherein the built-in function includes a mathematical formula that selects only a third field of records whose second field is equal to the second field of the selected combinations, wherein the mathematical formula is:

round(((X−mod(Y,X))/X)−0.5)*Z where X is the second field of the selected combination; Y is an occurrence of the second field of a record; and Z is an occurrence of the third field of a record;
wherein the second field is obtained from a range having a maximum value that is not more twice a minimum value;
executing the query statement to produce the aggregate result; and
displaying the aggregate result in a horizontal form at which includes a row corresponding to each first field wherein the row includes an aggregate result for each second field.

6. A computer-implemented method for performing a query on records in a table with at least a first field type and a second field type to obtain an aggregate result on second field occurrences of records for at least one selected first field occurrence, the method comprising;

receiving a query involving a single query statement that includes at least one built-in function corresponding to the selected first field occurrence, wherein the built-in function includes a mathematical formula that selects only a second field occurrence of records whose first field occurrence is equal to the selected first field, wherein the mathematical formula is:

round(((X−mod(Y,X))/X)−0.5)*Z where X is the second field of the selected combination; Y is an occurrence of the second field of a record; and Z is an occurrence of the third field of a record;
wherein the second field is obtained from a range having a maximum value that is not more twice a minimum value;
executing the query statement to produce the aggregate result; and
displaying the aggregate result in a horizontal format which includes a row wherein the row includes an aggregate result for each first field.

* * * * *

UNITED STATES PATENT AND TRADEMARK OFFICE
CERTIFICATE OF CORRECTION

PATENT NO. : 7,062,494 B2
APPLICATION NO. : 10/201436
DATED : June 13, 2006
INVENTOR(S) : Suhas Sudhakar Kulkarni It is certified that error appears in the above-identified patent and that said Letters Patent is hereby corrected as shown below:

In column 8, lines 9-10, in Claim 5, delete "combinations," and insert -- combination, --, therefor.

Signed and Sealed this

Thirteenth Day of April, 2010

David J. Kappos
*Director of the United States Patent and Trademark Office*